United States Patent [19]

Richter et al.

[11] 4,144,796

[45] Mar. 20, 1979

[54] EXPANSION DOWELL ASSEMBLY WITH SETTING CONTROL

[75] Inventors: Martin Richter, Freising, Fed. Rep. of Germany; Josef Entner, Franstanz, Austria

[73] Assignee: Hilti Aktiengesellschaft, Schaan, Liechtenstein

[21] Appl. No.: 821,151

[22] Filed: Aug. 2, 1977

[30] Foreign Application Priority Data

Aug. 9, 1976 [DE] Fed. Rep. of Germany ....... 2635805

[51] Int. Cl.$^2$ .................. F16B 13/06; F16B 31/02
[52] U.S. Cl. ................................... 85/61; 85/74
[58] Field of Search ............. 85/61, 62, 74, 72, 75; 81/52.4 R

[56] References Cited

U.S. PATENT DOCUMENTS

| | | | |
|---|---|---|---|
| 1,966,414 | 7/1934 | Main | 85/61 X |
| 2,332,971 | 10/1943 | Johnson | 81/52.4 R |
| 2,824,481 | 2/1958 | Johnson | 85/62 |
| 3,027,796 | 4/1962 | Shewmon | 85/61 |
| 3,191,486 | 6/1965 | Gibbens | 85/61 |
| 3,267,792 | 8/1966 | Yackle | 85/61 |
| 3,602,976 | 9/1971 | Grube | 85/61 X |

FOREIGN PATENT DOCUMENTS 633784 2/1962 Italy ........................... 85/74

*Primary Examiner*—Ramon S. Britts
*Attorney, Agent, or Firm*—Toren, McGeady and Stanger

[57] ABSTRACT

An expansion dowel assembly includes a sleeve, a tie rod insertable into the sleeve, an expanding body connected to one end of the tie rod and an end support on its other end. A member is connected to the end support for transmitting torque to it and by virtue of the torque applied to the end support the expanding body is drawn into the sleeve causing it to expand. Shear pins connect the member to the end support and when a predetermined torque is reached the pins shear off and the member can be removed from the end support. The shear pins can be arranged either parallel or perpendicular to the axis of the tie rod.

6 Claims, 7 Drawing Figures

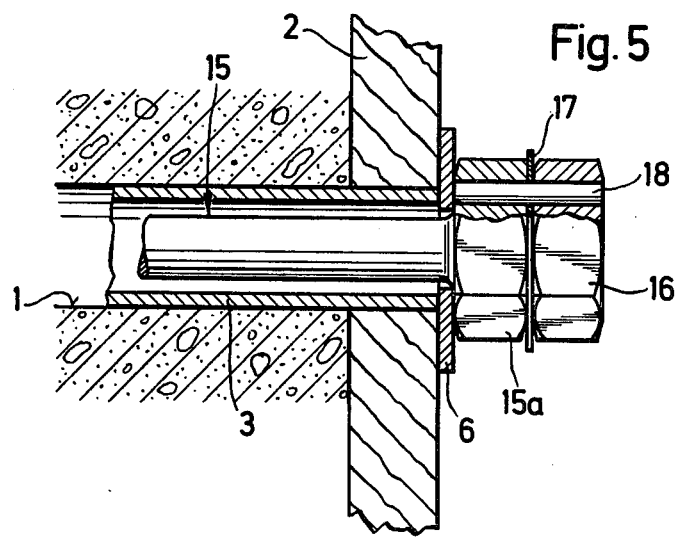
Fig. 5
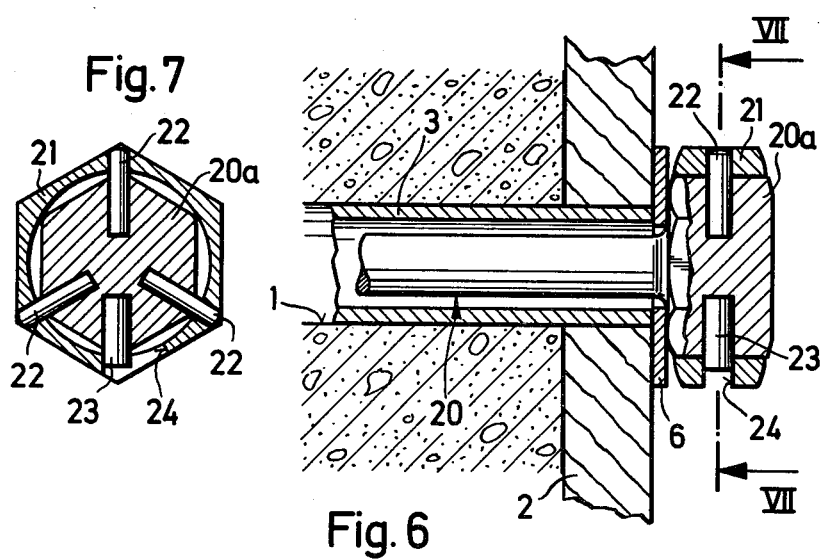
Fig. 7
Fig. 6

EXPANSION DOWELL ASSEMBLY WITH SETTING CONTROL

SUMMARY OF THE INVENTION

The present invention is directed to an expansion dowel assembly which includes a sleeve, a tie rod insertable into the sleeve with an expanding body at one end for expanding the sleeve and an end support at its other end for securing a load to a receiving material into which the dowel assembly is inserted. More specifically, the invention concerns means coaxially connected to the end support for applying torque to it with the means being separable from the end support when a predetermined torque is achieved.

To attain a sufficient loading capacity in expansion dowels, the expansion sleeve must be displaced with a predetermined force radially outwardly against the wall of the borehole into which the dowel is inserted. Depending on the hardness of the receiving material, the expanding body must be drawn for varying depths into the expansion sleeve. The force spreading or expanding the sleeve is transmitted by a tool, in the form of torque, to the end support on the tie rod of the dowel assembly. As the force required for expanding the sleeve increases, the torque transmitted to the end support likewise increases. The extent of the torque applied to the dowel assembly is, accordingly, a measure of the anchoring value of the dowel.

In the past, torque wrenches have been used to reach the optimum anchoring value of the dowel. Apart from the fact that a torque wrench is an expensive and delicate tool, this type of torque control does not take into account that different torques must be applied for different dowel sizes.

To overcome this problem, it has been known to use dowels which incorporate their own torque limiting element. On the end support located on the outer or trailing end of the rod, such as a nut or bolt head, a torque transmitting means is connected to the end support over a ring member having a preset breaking point. The outer lateral surface of the torque transmitting means has a hexagonal contour of the same size and shape as the end support. With this arrangement, the torque necessary for achieving the proper anchorage of the dowel can be transmitted by a simple tool, such a fork wrench, to the torque transmitting means. As soon as the predetermined anchoring value is achieved, the ring member can no longer transmit the increasing torque exerted by the tool on the torque transmitting means and, as a result, it breaks. With the torque transmitting means separated from the end supports, it is possible to continue to turn the end support by means of the tool for increasing the anchoring value.

An essential disadvantage of this arrangement is that the torque transmitting means arranged coaxially of the end support has the same outer form as the end support and the tool applying the torque can grip both the torque transmitting means and the end support at the same time. When this happens, the ring member is no longer subjected to a breaking load and does not break away from the end support. If the torque transmitting means is not separated from the end support, it is not possible to determine if the dowel is sufficiently anchored.

Another disadvantage of such a dowel assembly is that the breaking surface of the ring member which remains after the dowel has attained the desired anchoring value is susceptible to corrosion and reduces the effectiveness of the end support and impairs its appearance. Though the ring member has a preset breaking point, the breaking point is effective over a relatively wide range and, accordingly, the extent to which the dowel is adequately secured is not sufficiently accurate.

Therefore, it is the primary object of the present invention to overcome the problems experienced in the past by using shear pins for interconnecting the torque transmitting means to the end support.

Shear pins can be dimensioned accurately and reliably without any problems so that exact breaking forces can be obtained. Moreover, the breaking forces can be controlled by the number, the diameter and the proper selection of the material of the shear pins.

It is particularly advantageous if the shear pins are formed of aluminum alloys, since such corrosion inhibiting materials ensure a neat appearance for the end support of the dowel. Preferably, the shear pins are pressed into or cemented into corresponding receiving bores formed in the end support and in the torque transmitting means.

To prevent the possibility that the tool applying the torque contacts both the torque transmitting means and the end support, in one embodiment, a disk, larger in diameter than the end support, is positioned between the end support and the torque transmitting means when these members are aligned serially.

It is preferable if the shear pins are inserted into the end support of the torque transmitting means in parallel with the dowel axis. Such an arrangement ensures particularly accurate shearing conditions, since the torque transmitting means bears on one face directly on the end support with the shear pins being exposed to pure shearing stresses. To assure a uniform distribution of the shearing force, it is preferable if three shearing pins are arranged equiangularly apart. Further, it is advantageous if the torque applying means is centered relative to the end support by an axially directed centering pin.

In accordance with an other embodiment of the invention, the shear pins are disposed perpendicularly to the dowel axis extending from the torque transmitting means into the end support. In this arrangement, the torque transmitting means is in the form of a sleeve or cuff laterally embracing the circumferential periphery of the end support. This embodiment has the special advantage in that a small overall axial height of the end support and the torque transmitting means can be obtained, which has a particularly positive effect when the dowel assembly is used in locations which are difficult to reach. Furthermore, with the torque transmitting means laterally enclosing the end support, it ensures that the tool used for applying torque can only contact the torque transmitting means until the shear pins fracture or the torque transmitting means separates from the end support. Additionally, with the torque transmitting means laterally embracing the end support in a tight manner, a reliable centering of the end support is assured as well as a uniform distribution of the shearing forces.

In setting the dowel assembly into a receiving material, there is the risk that the operator will be surprised by the sudden breaking of the shear pins and the resulting free rotation of the torque transmitting means relative to the end support so that he might slip as the tool turns freely. This is of particular concern when the work of inserting the dowel assemblies is being performed on scaffolds where loss of balance by the operator could be serious. To avoid this risk, the present invention includes an embodiment including a stop positioned between the end support and the torque transmitting means which limits relative rotation between these two elements. By limiting the relative rotation it is possible to ensure that the torque transmitting means is only turned through a small angular distance after the shear pins break thereby limiting the possibility that the operator might slip due to the free movement of his tool.

In another feature of the invention, the stop for relative movement between the end support and the torque transmitting means is designed as a pin extending into a groove with the groove extending from the pin in the direction opposite to the tightening direction of the dowel. The stop pin is selected with a capacity for absorbing forces greater than the total shearing force of the shear pins, if possible. The stop pin can transmit greater torque from the torque transmitting means to the end support after the shear pins break so that the dowel can be tightened to its maximum anchoring value.

The stop pin can secure the torque transmitting means in a form-locking manner via a head, so that the torque transmitting means cannot drop off the end support of a set dowel. The limited free rotation movement of the torque transmitting means relative to the end support indicates that the dowel is secured in the receiving material at least with a predetermined anchoring value.

In one embodiment, the torque transmitting means is cap-shaped enclosing both the side and outer end surfaces of the end support. Using a cap-shaped member, it is possible to insert the shear pins either parallel to or normal to the dowel axis. This arrangement is advantageous because the cap-shaped member is in form-locking engagement with the end support bearing on its lateral and end surfaces, accordingly, the shear pins cannot be stressed when the dowel assembly falls on its head. As a result, the dowel assembly is insensitive to blows on its head. Using such a cap-shaped member also ensures that the tool applying torque only engages the torque transmitting means until the predetermined anchoring value of the dowel has been attained.

Another feature of the invention is that the outer surfaces of the end support can be formed as working surfaces for engagement by a tool applying torque to the dowel assembly. After the shear pins break and the torque transmitting means is removed from the end support, a tool can be attached to the end support for applying a torque and increasing the anchoring value of the dowel. Normally, it is also possible to loosen the dowel by means of the tool fitted onto the working surfaces of the end support. Preferably, the circumferential surface of the end support has a hexagonal shape and is in the form of a nut or a bolt head.

When the shear pins are designed for the maximum expanding value of the sleeve limited by the capacity of the dowel itself or by the strength of the receiving material, the end support should not be further tightened or loosened, to avoid any impairment of the anchoring value. To indicate any further manipulation of the end support, its working surfaces, that is, the surfaces to which a tool is applied, are provided with a destructible protective coat. Such a protective coat can be a coat of paint or plastic applied by dipping which is removed from the end support when a tool is applied to it. A destructible metal coat is also suitable for use as the protective coat.

To afford the ability to recognize the anchored state of a dowel from a distance, it is advisable to provide the torque transmitting means, the end support or a protective destructible coat surrounding the end support with a continuous color marking.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawing:

FIG. 5 is a partial side view, partly in section, of still another expansion dowel assembly with the shear pins disposed parallel to the dowel axis;

FIG. 6 is yet another embodiment of an expansion dowel assembly illustrated in a partial side view, partly in section, with the shear pins extending normal to the dowel axis; and FIG. 7 is a sectional view taken along the line VII—VII in FIG. 6.

DETAILED DESCRIPTION OF THE INVENTION

Figure 1:
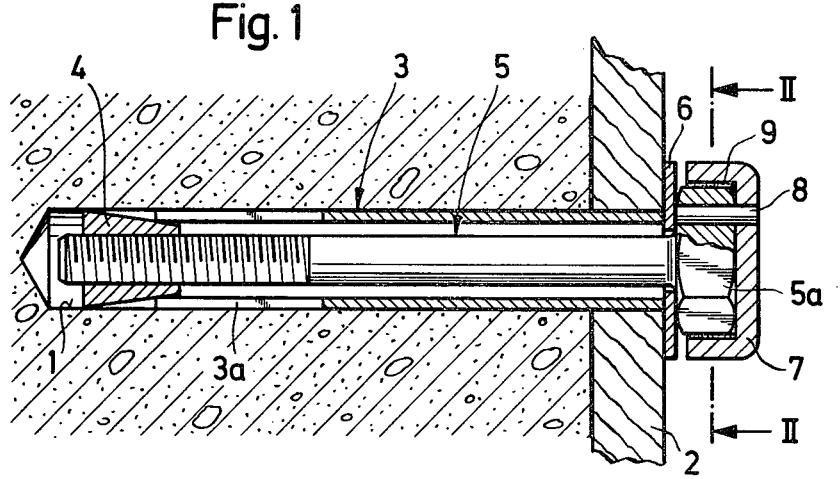
FIG. 1 is a side view, partly in section, of an expansion dowel assembly inserted into a receiving material but before the dowel is expanded into anchored engagement with the receiving material, further the tie rod of the assembly is in the form of a bolt.

In the embodiments of the invention illustrated in the drawing, the various elements making up the dowel assembly have a leading end and a trailing end, the leading end refers to the end inserted first into the borehole in the receiving material while the trailing end is the oppositely directed end of the element.

In FIG. 1, an expansion dowel assembly is shown inserted into a borehole 1 formed in a receiving material, such as concrete, with the dowel assembly serving to fasten an object 2 to the surface of the receiving material.

The dowel assembly includes an expanding sleeve 3. A frusto-conically shaped expanding body 4 is located at the leading end of the sleeve and is drawn toward the trailing end by a tie rod 5. The tie rod is in the form of a threaded bolt. The expanding body 4 is in threaded engagement with the threaded leading end of the tie rod so that by turning the tie rod in the tightening direction, the expansion body is drawn into the sleeve causing it to expand. In FIG. 1, of course, the sleeve has not yet been expanded into anchoring contact with the surface of the boreholes in the receiving material. Slots 3a are formed in the sleeve 3 extending from its leading end for facilitating its expansion feature. At the trailing end of the tie rod 5, a bolt head 5a forms the end support which bears against a washer 6 for securing the object 2 to the outer surface of the receiving material.

Figure 2:
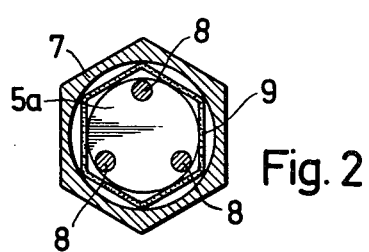
FIG. 2 is a sectional view of the dowel assembly taken along the line II—II in FIG. 1.

The torque applied to the head 5a for effecting the tightening action, is afforded by means of a known tool, not shown, which acts on the torque transmitting means in the form of a cap-shaped member 7 in FIG. 1. The cap-shaped member laterally encloses the circumferentially extending working surfaces or flats of the bolt head 5a and in addition, affords a cover across the outer end face of the bolt head. Shear pins 8 extending parallel to the axis of the tie rod, interconnect the cap-shaped member 7 and the end support or bolt head 5a. As is illustrated in FIG. 2, three equiangularly spaced shear pins 8 interconnect the bolt head and the cap-shaped member. Both the bolt head 5a and the cap-shaped member 7 have a hexagonally shaped lateral surface so that the surfaces can be gripped by a tool for applying torque to the dowel assembly. Further, a destructible protective coat 9 is formed on the lateral hexagonal surfaces of the bolt head 5a and the coat is destroyed when a tool acts on the hexagonal surfaces of the bolt head. Accordingly, the protective coat 9 indicates whether further tightening or loosening actions have been applied to the head 5a.

To anchor the dowel assembly, cap-shaped member 7 is turned about the axis of the tie rod by means of a tool, such as a wrench, in the tightening direction so that the expanding body 4 is pulled from the leading end toward the trailing end into the expanding sleeve 3, whereby the sleeve is forced outwardly into anchoring engagement with the wall surfaces of borehole 1 in the receiving material. As the expanding body is drawn further into the sleeve, the pressure acting on the sleeve increases and the anchoring value of the dowel is also increased. The increasing spreading force must be transmitted from the tool to the cap-shaped member 7 which transmits the torque to the bolt head 5a of the tie rod 5. During this tightening action, the shear pins 8 are uniformly stressed and the inside surface of the cap-shaped member is cylindrically shaped so that it acts as a guide for the cap-shaped member. The torque is transmitted from the cap-shaped member over the shear pins 8 to the bolt head 5a. The shear pins are dimensioned so that their shearing stress is reached when the predetermined anchoring value of the dowel assembly has been achieved. When the predetermined anchoring value is attained, the pins can no longer transmit the torque applied by the tool and they shear off. When this occurs, the cap-shaped member 7 can be removed and the bolt head 5a is exposed.

Figure 3:
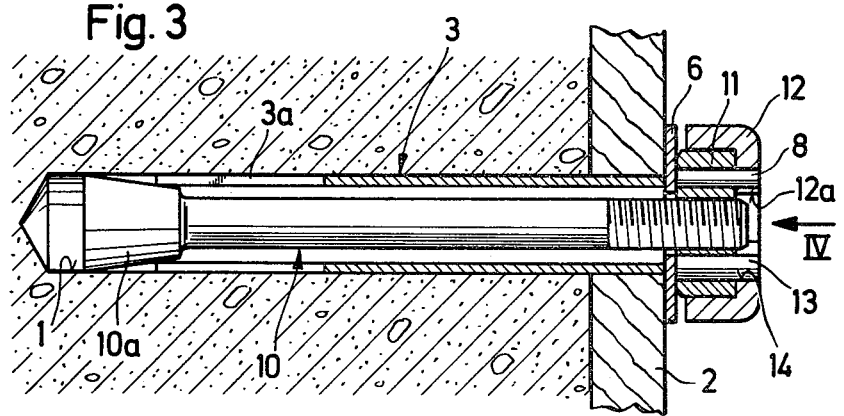
FIG. 3 is a side view, partly in section, similar to FIG. 1, of another expansion dowel assembly inserted into a receiving material, however, the dowel is not in anchored engagement with the receiving material and, further, its tie rod is in the form of a threaded stud with a nut attached to the stud.

In the dowel assembly illustrated in FIG. 3, a tie rod 10 in the form of a stud has an expanding body 10a integrally attached to its leading end. The expanding body 10a is pulled into the expanding sleeve 3 in the same manner as described in FIG. 1, that is, by tightening an end support in the form of a nut 11 onto the threaded trailing end of the tie rod. To permit sufficient tightening action on the nut 11, a cap-shaped member 12 which covers the nut, has an axially aligned bore 12a so that the trailing end of the stud can be displaced rearwardly through the cap-shaped member 12 during the tightening action.

Figure 4:
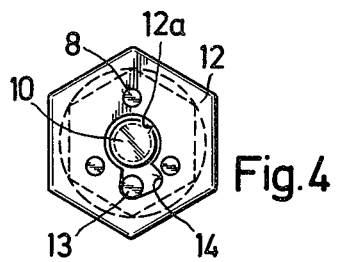
FIG. 4 is an end view of the dowel assembly shown in FIG. 3 taken in the direction of the arrow IV.

In addition to the shear pins 8 interconnecting the nut 11 and the cap-shaped member 12, a pin 13 is secured to the nut in parallel relation with the axis of the tie rod and extends from the nut into a free-running groove 14 formed in the cap-shaped member, note FIG. 4. As shown in FIGS. 3 and 4, the dowel assembly has not been anchored within the receiving material, accordingly, the pin 13 is in a first position, that is, the position it maintains while the nut and cap-shaped member are interconnected by the shear pins 8. After the three shear pins 8, equiangularly spaced apart from one another, have been sheared off, the pin 13 which has a considerably larger cross section than the shear pins, assures that the cap-shaped member 12 can rotate relative to the nut by an angular amount corresponding to the angular length of the free-running groove 14 in the cap-shaped member. As a result, the risk that the operator tightening the dowel assembly might be startled by the sudden breaking of the shear pins 8, is eliminated to a great extent. Furthermore, if the pin 13 has an adequate strength, it is possible for the nut to be further tightened by the cap-shaped member 12.

In FIG. 5, a dowel assembly is shown including a tie rod 15 in the form of a bolt threaded at its leading end in the manner shown in FIG. 1. The tie rod has a bolt head 15a interconnected with a torque transmitting means in the form of a separate bolt head or solid nut 16 with the interconnection between the solid nut and the bolt head being provided by shear pins 18 cemented into or pressed into these two parts. To avoid any undesired overlapping of the tool applying torque from the solid nut 16 to the bolt head 15a, a separating washer 17 is positioned between these two parts and the circumferential edge of the washer has a diameter greater than the maximum diameter of the bolt head so that a wrench fitted onto the solid nut cannot slip downwardly onto the working surfaces of the bolt head 15a.

In FIG. 6 still another embodiment of the invention is represented with the dowel assembly including a tie rod 20 in the form of a bolt. Laterally enclosing the working surfaces of a bolt head 20a is a hexagon shaped ring 21. Unlike the other embodiment, shear pins 22 extending perpendicularly to the axis of the tie rod form the torque transmitting means between the hexagon ring 21 and the head 20a. In addition, a pin 23 which acts as a stop in the same manner as the pin 13 in FIGS. 3 and 4, is secured into the bolt head 20a and extends radially outwardly into a free-running groove 24 in the hexagon shaped ring 21.

As illustrated in FIG. 7, the groove extends in the opposite direction to the tightening direction of the dowel assembly. Furthermore, shear pins 22 are equiangularly spaced apart as can be seen in FIG. 7. The pin 23 is of a larger diameter than the shear pins and has a greater strength so that when the shear pins break, it continues intact permitting the ring to rotate angularly for a distance corresponding to the angular length of the groove 24. This arrangement is the same as the groove shown in FIGS. 3 and 4.

The manner in which the expanding action of the dowel assembly occurs in FIGS. 3-7 is similar to that described for the dowel assembly displayed in FIGS. 1 and 2.

While specific embodiments of the invention have been shown and described in detail to illustrate the application of the inventive principles, it will be understood that the invention may be embodied otherwise without departing from such principles.

What is claimed is:

1. Expansion dowel assembly such as for insertion into a borehole in a receiving material for attaching a load to the receiving material, comprising an axially elongated expanding sleeve forming an axially extending bore therethrough with said sleeve and the bore having a leading end arranged to be inserted first into the borehole and a trailing end at the opposite end thereof, an axially elongated tie rod extending through the bore in said sleeve from the trailing end of the bore at least toward the leading end of the bore, said tie rod having a leading end extending into the bore in said sleeve and a trailing end extending outwardly from the trailing end of said sleeve, an expanding body connected to the leading end of said tie rod and arranged to be drawn into the leading end of the bore for expanding said sleeve, an end support coaxially mounted on said tie rod and located outwardly of the trailing end of said sleeve, torque transmitting means arranged coaxially with and connected to said end support for transmitting torque to said end support, said torque transmitting means being separable from said end support when a predetermined torque is applied to the end support, wherein the improvement comprises that said end support has a plurality of planar working surfaces forming the radially outer circumferential periphery thereof with said working surfaces extending laterally of and around the axis of said tie rod and said working surfaces arranged to receive a tool so that torque can be applied directly to said end support working surfaces after said torque transmitting means are separated from said end support, said torque transmitting means includes a cap-shaped member to which torque can be applied, said cap-shaped member extending laterally around and enclosing the planar working surfaces on said end support and across the end surface of said end support extending transversely of the axis of said tie rod located more remote from the trailing end of said sleeve, shear pins inserted into and held by said end support and said cap-shaped member and said pins extending in parallel relation with the axis of said tie rod, said shear pins releasably connecting said cap-shaped member to said end support for transmitting torque to said end support until a predetermined torque is attained at which point said pins shear so that if further torque is applied to said cap-shaped member after said pins shear, said cap-shaped member rotates relative to said end support about the axis thereof and can be removed from said end support, said cap-shaped member having a continuous cylindrically shaped inner surface for its axial extent coextensive with said end support with the diameter of the inner surface being greater than the maximum transverse dimenstion of said end support so that said cap-shaped member rotates relative to said end support without any frictional engagement with said end support after said shear pins shear.

2. Expansion dowel assembly, as set forth in claim 1, including a stop secured to one of said end support and said cap-shaped member for limiting relative rotational movement between said end support and said cap-shaped member after said pins have sheared.

3. Expansion dowel assembly, as set forth in claim 2, wherein said stop comprises a pin secured to one of said end support and said cap-shaped member and a groove of limited angular length formed in the other one of said end support and said cap-shaped member so that said pin traverses said groove when said end support and said cap-shaped member move rotationally relative to one another, said groove having a first end and a second end, said pin being located in the first end of said groove until said shear pins shear off permitting relative rotational movement between said end support and said cap-shaped member and during relative rotational movement said pin moves relative to the groove from the first and to the second end thereof and the second end of said groove acts as a stop surface for said pin.

4. Expansion dowel assembly, as set forth in claim 1, wherein a destructible protective cost covers the working surfaces of said end support.

5. Expansion dowel assembly, as set forth in claim 1, wherein said end support comprises a hexagonal bolt heat integrally secured to said tie rod at the trailing end thereof, said tie rod having a thread extending axially from the leading end thereof and said expanding body being threaded onto said thread on said tie rod, said cap-shaped member fitting over said hexagonally shaped bolt head, said cap-shaped member having an outer cross sectional shape corresponding to the cross sectional shape of said bolt head, and at least three said shear pins interconnecting said cap-shaped member and said bolt head.

6. Expansion dowel assembly, as set forth in claim 1, wherein said tie rod has a thread extending from the trailing end thereof toward the leading end, said end support comprises a nut threaded onto the threaded end of said tie rod, said expanding body being formed integrally with said tie rod and forming the leading end thereof, said cap-shaped member fitting over said nut, said cap-shaped member having an outer cross sectional shape corresponding to the cross sectional shape of said nut, and at least three said shear pins interconnecting said cap-shaped member to said nut.

* * * * *